(12) United States Patent
Murad

(10) Patent No.: US 11,610,336 B2
(45) Date of Patent: Mar. 21, 2023

(54) METHODS AND SYSTEMS TO DETECT VEHICLE EVENTS USING VEHICLE CAMERAS

(71) Applicant: GM GLOBAL TECHNOLOGY OPERATIONS LLC, Detroit, MI (US)

(72) Inventor: Mohannad Murad, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 105 days.

(21) Appl. No.: 17/163,949

(22) Filed: Feb. 1, 2021

(65) Prior Publication Data
US 2022/0245857 A1   Aug. 4, 2022

(51) Int. Cl.
```
G06K 9/00      (2022.01)
G06T 7/73      (2017.01)
B60L 53/37     (2019.01)
B60R 11/04     (2006.01)
B60Q 9/00      (2006.01)
G06V 20/56     (2022.01)
G06V 20/59     (2022.01)
```
(52) U.S. Cl.
CPC .............. *G06T 7/74* (2017.01); *B60L 53/37* (2019.02); *B60Q 9/00* (2013.01); *B60R 11/04* (2013.01); *G06V 20/56* (2022.01); *G06V 20/59* (2022.01); *G06T 2207/30252* (2013.01); *G06T 2207/30268* (2013.01)

(58) Field of Classification Search
CPC ............ G06T 7/74; G06T 2207/30252; G06T 2207/30268; B60L 53/37; B60Q 9/00; B60R 11/04; G06V 20/56; G06V 20/59
See application file for complete search history.

(56) References Cited

U.S. PATENT DOCUMENTS

| | | | |
|---|---|---|---|
| 10,719,998 B2 | 7/2020 | Joodaki et al. | |
| 2018/0336423 A1* | 11/2018 | Ban | G06N 3/0445 |
| 2020/0293800 A1* | 9/2020 | Yoshimura | G06T 7/00 |
| 2021/0141043 A1* | 5/2021 | Bertness | H01M 10/482 |

* cited by examiner

*Primary Examiner* — Dhaval V Patel
(74) *Attorney, Agent, or Firm* — Lorenz & Kopf LLP

(57) ABSTRACT

In exemplary embodiments, methods and systems are provided for determining vehicle events. In an exemplary embodiment, a system is provided that includes: one or more cameras onboard a vehicle that are configured to generate camera data; and a processor that is coupled to the one or more cameras and configured to at least facilitate: identifying a change in position of one or more objects of the camera data using the camera data; and determining that a vehicle event has occurred, based on the change in position of the one or more objects of the camera data.

20 Claims, 6 Drawing Sheets

METHODS AND SYSTEMS TO DETECT VEHICLE EVENTS USING VEHICLE CAMERAS

TECHNICAL FIELD

The technical field generally relates to vehicles, and more particularly relates to methods and systems for utilizing cameras to detect vehicle events, for example when a parked host vehicle is contacted by another vehicle.

Certain vehicles today have sensors and systems to detect when a vehicle event occurs for a host vehicle, including when another vehicle contacts the host vehicle. However, such existing sensors and systems may not always provide optimal detection of vehicle events, for example when the host vehicle is parked and/or such sensors and systems are not activated or functioning.

Accordingly, it may be desirable to provide improved methods and systems for detecting vehicle events, such as when another vehicle contacts the host vehicle. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a method is provided that includes: (i) obtaining camera data from one or more cameras onboard a vehicle; (ii) identifying, via a processor, a change in position of one or more objects of the camera data using the camera data; and (iii) determining, via the processor, that a vehicle event has occurred, based on the change in position of the one or more objects of the camera data.

Also in an exemplary embodiment, the step of obtaining the camera data includes obtaining the camera data from one or more cameras facing inside a cabin of the vehicle; the step of identifying the change in position includes identifying, via the processor, the change in position of one or more objects inside the cabin of the vehicle using the camera data; and the step of determining that the vehicle event has occurred includes determining, via the processor, that the vehicle event has occurred based on the change in position of the one or more objects inside the cabin of the vehicle.

Also in an exemplary embodiment, the step of identifying the change in position includes identifying, via the processor, the change in position of the one or more objects disposed on a seat of the vehicle using the camera data; and the step of determining that the vehicle event has occurred included determining, via the processor, that the vehicle event has occurred based on the change in position of the one or more objects on the seat of the vehicle.

Also in an exemplary embodiment, the step of obtaining the camera data includes obtaining the camera data from one or more cameras facing outside the vehicle.

Also in an exemplary embodiment, the step of identifying the change in position includes identifying, via the processor, the change in position of a body reference of the vehicle using the camera data; and the step of determining that the vehicle event has occurred includes determining, via the processor, that the vehicle event has occurred based on the change in position of the body reference of the vehicle.

Also in an exemplary embodiment, the step of identifying the change in position includes identifying, via the processor, the change in position of a fixed feature outside the vehicle using the camera data; and the step of determining that the vehicle event has occurred includes determining, via the processor, that the vehicle event has occurred based on the change in position of the fixed feature outside the vehicle.

Also in an exemplary embodiment, the method further includes providing a notification, via instructions provided by the processor, when the vehicle event is determined to have occurred based on the change in position of the one or more objects of the camera data.

Also in an exemplary embodiment, the vehicle includes a rechargeable energy storage system (RESS), and the method further includes disengaging the RESS, via the instructions provided by the processor, when the vehicle event is determined to have occurred based on the change in position of the one or more objects of the camera data.

In another exemplary embodiment, a system is provided that includes: one or more cameras onboard a vehicle that are configured to generate camera data; and a processor that is coupled to the one or more cameras and configured to at least facilitate: identifying a change in position of one or more objects of the camera data using the camera data; and determining that a vehicle event has occurred, based on the change in position of the one or more objects of the camera data.

Also in an exemplary embodiment, the one or more cameras face inside a cabin of the vehicle; and the processor is configured to at least facilitate: identifying the change in position of one or more objects inside the cabin of the vehicle using the camera data; and determining that the vehicle event has occurred based on the change in position of the one or more objects inside the cabin of the vehicle.

Also in an exemplary embodiment, the processor is configured to at least facilitate:

identifying the change in position of the one or more objects disposed on a seat of the vehicle using the camera data; and determining that the vehicle event has occurred based on the change in position of the one or more objects on the seat of the vehicle.

Also in an exemplary embodiment, the processor is configured to at least facilitate obtaining the camera data from one or more cameras facing outside the vehicle.

Also in an exemplary embodiment, the processor is configured to at least facilitate: identifying the change in position of a body reference of the vehicle using the camera data; and determining that the vehicle event has occurred based on the change in position of the body reference of the vehicle.

Also in an exemplary embodiment, the processor is configured to at least facilitate: identifying the change in position of a fixed feature outside the vehicle using the camera data; and determining that the vehicle event has occurred based on the change in position of the fixed feature outside the vehicle.

Also in an exemplary embodiment, the processor is configured to at least facilitate providing a notification when the vehicle event is determined to have occurred based on the change in position of the one or more objects of the camera data.

Also in an exemplary embodiment, the processor is configured to at least facilitate disengaging the RESS when the vehicle event is determined to have occurred based on the change in position of the one or more objects of the camera data.

In another exemplary embodiment, a vehicle is provided that includes: a body; a drive system configured to propel the body; one or more cameras onboard the body and configured to generate camera data; and a processor that is coupled to the one or more cameras and configured to at least facilitate: identifying a change in position of one or more objects of the camera data using the camera data; and determining that a vehicle event has occurred, based on the change in position of the one or more objects of the camera data.

Also in an exemplary embodiment: the body forms a cabin for the vehicle; the one or more cameras face inside the cabin; and the processor is configured to at least facilitate: identifying the change in position of one or more objects inside the cabin using the camera data; and determining that the vehicle event has occurred based on the change in position of the one or more objects inside the cabin.

Also in an exemplary embodiment: the one or more cameras face outward of the cabin of the vehicle; and the processor is configured to at least facilitate: identifying the change in position of a body reference of the vehicle using the camera data; and determining that the vehicle event has occurred based on the change in position of the body reference of the vehicle.

Also in an exemplary embodiment: the one or more cabins face outward of the cabin of the vehicle; and the processor is configured to at least facilitate: identifying the change in position of a fixed feature outside the vehicle using the camera data; and determining that the vehicle event has occurred based on the change in position of the fixed feature outside the vehicle.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
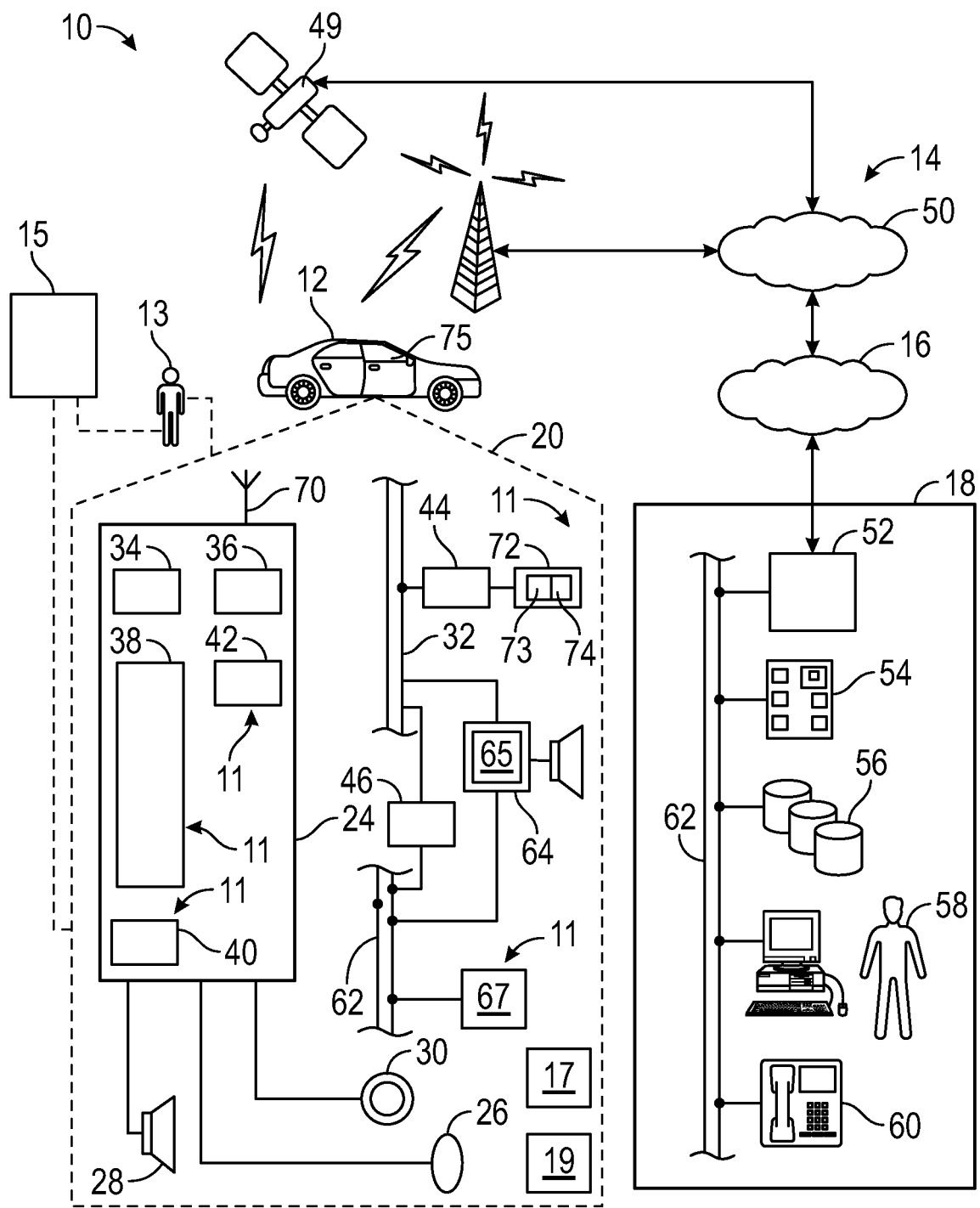
FIG. 1 is a functional block diagram of a communications system that includes a vehicle having a control system that is configured to detect vehicle events based on camera data, in accordance with an exemplary embodiment.

FIG. 1 is a functional block diagram of a communications system 10, in accordance with an exemplary embodiment. As described in greater detail further below, the communications system 10 includes a vehicle 12 (also referred to herein as the "host vehicle") that includes a control system 11 that is configured to detect vehicle events, such as when another vehicle contacts the vehicle 12, using camera data. As described further below in connection with FIG. 1 as well as FIG. 2, in various embodiments, the control system 11 includes a processor 38, computer memory 40, internal cameras 73, external cameras 74, and one or more displays 67. In certain embodiments, the control system may also include a satellite-based location determining system component (e.g., GPS) 42, among various other components.

In certain embodiments, the vehicle 12 comprises an electric vehicle or hybrid electric vehicle, and is operated using a motor 17 (e.g., an electric motor) and a rechargeable energy storage systems (RESS) (e.g., a high voltage battery). However, this may vary in other embodiments.

As depicted in FIG. 1, in certain embodiments, the user 13 also has a device 15, such as a smart phone, computer, and/or other electronic device 15, for example that may communicate with both the user 13 and the vehicle 12.

As depicted in FIG. 1, the communications system 10 generally includes the vehicle 12, along with one or more wireless carrier systems 14, one or more land networks 16, and one or more remote servers 18. It should be appreciated that the overall architecture, setup, and operation, as well as the individual components of the illustrated system are merely exemplary and that differently configured communications systems may also be utilized to implement the examples of the method disclosed herein. Thus, the following paragraphs, which provide a brief overview of the illustrated communications system 10, are not intended to be limiting.

The vehicle 12 may be any type of mobile vehicle such as a motorcycle, car, truck, recreational vehicle (RV), boat, plane, farm equipment, or the like, and is equipped with suitable hardware and software that enables it to communicate over communications system 10. As shown in FIG. 1, in various embodiments the vehicle hardware 20 is disposed within a body 19 of the vehicle 12, and includes a telematics unit 24, a microphone 26, a speaker 28, and buttons and/or controls 30 connected to the telematics unit 24. Operatively coupled to the telematics unit 24 is a network connection or vehicle bus 32. Examples of suitable network connections include a controller area network (CAN), a media-oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is an onboard device that provides a variety of services through its communication with the remote server 18, and generally includes an electronic processing device (processor) 38, one or more types of electronic memory 40, a cellular chipset/component 34, a wireless modem 36, a dual mode antenna 70, and a navigation unit containing a GPS chipset/component 42. In one example, the wireless modem 36 includes a computer program and/or set of software routines adapted to be executed within electronic processing device 38.

In various embodiments, the telematics unit 24 can be an embedded/installed within the vehicle 12 at the time of manufacture, or may be an aftermarket unit that is installed after manufacture of the vehicle 12. In various embodiments, the telematics unit 24 enables voice and/or data communications over one or more wireless networks (e.g., wireless carrier system 14), and/or via wireless networking, thereby allowing communications with the remote server 18 and/or other vehicles and/or systems.

In various embodiments, the telematics unit 24 may use radio transmissions to establish a voice and/or data channel with the wireless carrier system 14 so that both voice and data transmissions can be sent and received over the voice and/or data channels. Vehicle communications are enabled via the cellular chipset/component 34 for voice communications and the wireless modem 36 for data transmission. Any suitable encoding or modulation technique may be used with the present examples, including digital transmission technologies, such as TDMA (time division multiple access), CDMA (code division multiple access), W-CDMA (wideband CDMA), FDMA (frequency division multiple access), OFDMA (orthogonal frequency division multiple access), and the like. In one embodiment, dual mode antenna 70 services the GPS chipset/component 42 and the cellular chipset/component 34. In various embodiments, the telematics unit 24 utilizes cellular communication according to industry standards, such as LTE, 5G, or the like. In addition, in various embodiments, the telematics unit 24 carries out wireless networking between the vehicle 12 and one or more other network devices, for example using one or more wireless protocols such as one or more IEEE 802.11 protocols, WiMAX, or Bluetooth.

The telematics unit 24 may offer a number of different services for users of the vehicle 12, including detecting when a vehicle event occurs (including when another vehicle contacts the vehicle 12), as well as notifying a vehicle user and disengaging the RESS 19 when such a vehicle event occurs.

In addition, in certain embodiments, the telematics unit 24 may also provide connection with electronic devices 15. In various embodiments, the electronic devices may include, by way of example, various consumer electronic/mobile devices, such as a smart phone, a laptop, a smart wearable device, a tablet computer, a network computer, and/or one or more other electronic devices and/or combinations thereof.

In various embodiments, one or more short-range wireless connection (SRWC) protocols (e.g., Bluetooth/Bluetooth Low Energy, or Wi-Fi) may be utilized. In various embodiments, once the SRWC is established, the electronic devices 15 may be become bonded and/or recognized as network participants for the telematics unit 24, for example for current uses as well as in the future. For example, in certain embodiments, when the electronic device 15 is subsequently in wireless range with the telematics unit 24 after the initial pairing, telematics unit 24 (and/or the remote server 18) may confirm that the electronic device 15 is recognized as already being paired or established as a network participant for communicating with the telematics unit 24 and receiving services therefrom.

In addition, in various embodiments, the telematics unit 24 may also provide other services, such as, by way of example: turn-by-turn directions and other navigation-related services provided in conjunction with the GPS chipset/component 42; emergency assistance services, information requests from the users of the vehicle 12 (e.g., regarding points of interest en route while the vehicle 12 is travelling), and/or infotainment-related services, for example in which music, internet web pages, movies, television programs, videogames, and/or other content are downloaded by an infotainment center 46 that may be part of the telematics unit 24 and/or operatively connected to the telematics unit 24 via vehicle bus 32 and audio bus 22, among various other types of possible services.

With respect to other electronic components utilized in connection with the telematics unit 24, the microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and remote server 18 to communicate with the occupants through audible speech. The vehicle hardware also includes one or more buttons and/or controls 30 for enabling a vehicle occupant to activate or engage one or more of the vehicle hardware components 20. For example, one of the buttons and/or controls 30 can be an electronic pushbutton used to initiate voice communication with remote server 18 (whether it be a human such as advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22. In various embodiments, the audio component 64 includes radio system 65 (which also includes antenna 70, as well as amplifiers, speakers, and the like, in certain embodiments).

Also in various embodiments, display component 67 provides a visual display for the driver 13 of the vehicle 12. In various embodiments, the display components 67 provides a visual display for the driver 13 as to camera data provided from the internal cameras 73 and external cameras 74 as to a possible vehicle event, for example as described in greater detail further below in connection with FIGS. 2-9. For example, in certain embodiments, the display component 67 may comprise one or more visual display systems such as a visual display screen for a navigation system of the vehicle, a head up display (HUD) and/or other visual display and/or visual projection, such as on a windshield of the vehicle 12, and so on. In certain embodiments, such information may also be provided via an audio system, such as the audio component 64.

Vehicle sensors 72, connected to various sensor interface modules 44 are operatively connected to the vehicle bus 32.

In various embodiments, the vehicle sensors 72 include both internal cameras 73 and external cameras 74. In various embodiments, one or more internal cameras 73 (e.g., mounted on a vehicle ceiling, mirror, dash, and/or other location inside a cabin 75 of the vehicle 12) capture and detect movement of objects within the cabin 75 of the vehicle 12 when a vehicle event occurs.

Also in various embodiments, the external cameras 74 are mounted at various locations outside the vehicle 12, in order to ascertain where a vehicle event has occurred based on images from cameras facing outward from the vehicle 12. In certain embodiments, the external cameras 74 capture changes in one or more fixed reference points of the vehicle 12 (e.g., with respect to a rear camera and/or other external camera 74 of the vehicle 12) and movement of a fixed scene feature outside the vehicle 12 (e.g., with respect to any number of external cameras 74 of the vehicle 12). In certain embodiments, the external cameras 74 include a rear camera that captures images behind the vehicle 12, and for example that includes a reference feature on the vehicle 12 in the images. In addition, in certain embodiments, multiple external cameras 74 are positioned around the vehicle 12, so as to provide a three hundred sixty degree view outside and around the vehicle 12.

In addition, in various embodiments, the vehicle sensors 72 may also include any number of additional sensors including, by way of example, gyroscopes, accelerometers, magnetometers, emission detection, and/or control sensors, and the like. Also in various embodiments, exemplary sensor interface modules 44 include powertrain control, climate control, and body control, to name but a few.

In various embodiments, the wireless carrier systems 14 may be any number of cellular telephone systems, satellite-based wireless systems, and/or any other suitable wireless systems, for example that transmits signals between the vehicle hardware 20 and land network 16 (and/or, in certain embodiments, that communicate directly with the vehicle 12 and/or the remote server 18). According to certain examples, wireless carrier system 14 may include and/or be coupled to one or more cell towers 48, satellites 49, base stations and/or mobile switching centers (MSCs) 50, as well as any other networking components required to connect the wireless carrier system 14 with land network 16. As appreciated by those skilled in the art, various cell tower/base station/MSC arrangements are possible and could be used with wireless carrier system 14.

The land network 16 can be a conventional land-based telecommunications network that is connected to one or more landline telephones, and that connects wireless carrier system 14 to remote server 18. For example, the land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

The remote server 18 is designed to provide the vehicle hardware 20 with a number of different system back-end functions and, according to the example shown here, generally includes one or more switches 52, servers 54, databases 56, advisors 58, as well as a variety of other telecommunication/computer equipment 60. These various call center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either advisor 58 or an automated response system, and data transmissions are passed on to a modem or other piece of telecommunication/computer equipment 60 for demodulation and further signal processing.

The modem or other telecommunication/computer equipment 60 may include an encoder, as previously explained, and can be connected to various devices such as a server 54 and database 56. For example, database 56 could be designed to store subscriber profile records, subscriber behavioral patterns, or any other pertinent subscriber information. Although the illustrated example has been described as it would be used in conjunction with a remote server 18 that is manned, it will be appreciated that the remote server 18 can be any central or remote facility, manned or unmanned, mobile, or fixed.

Figure 2:
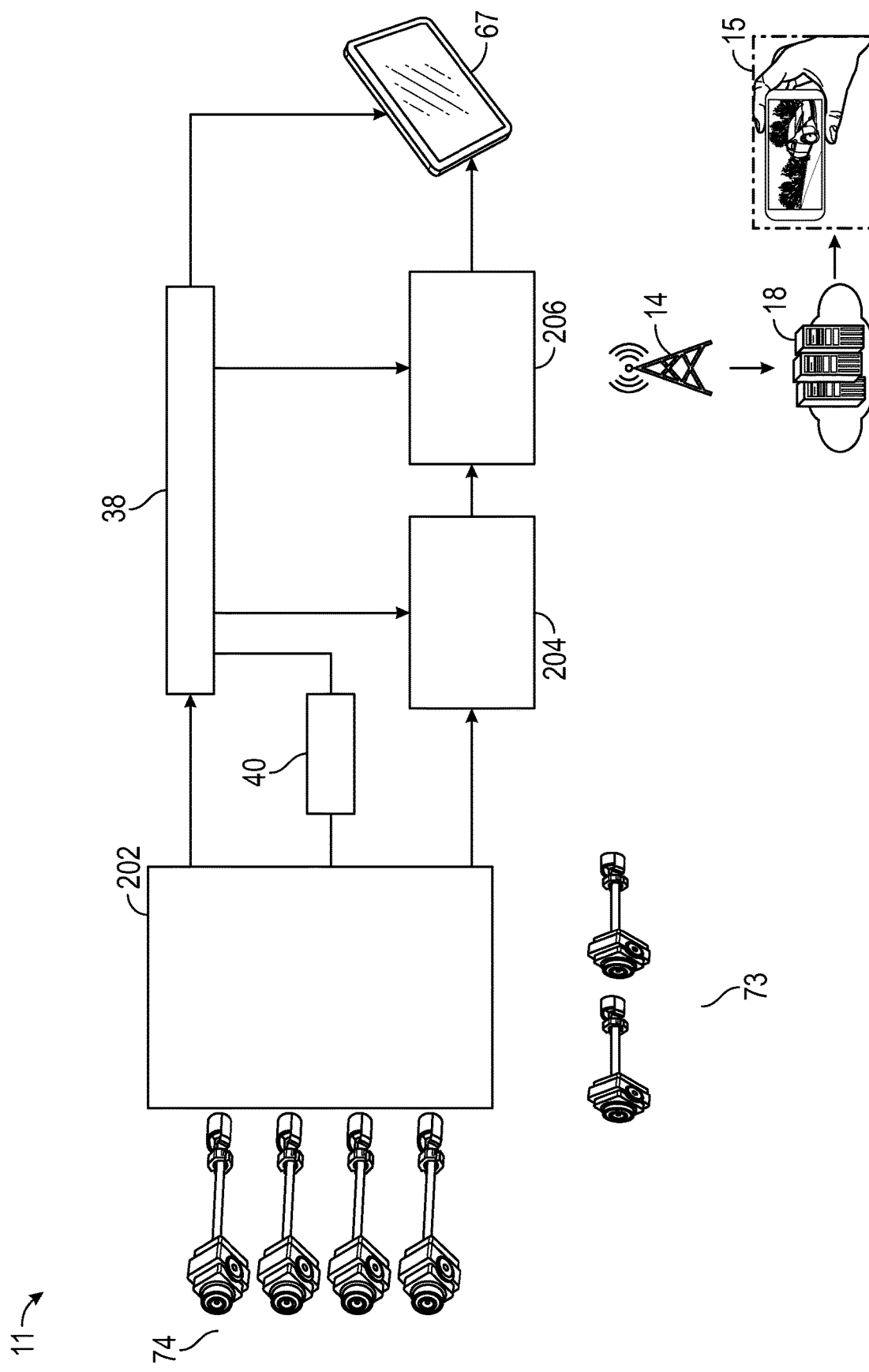
FIG. 2 is a flow diagram depicting functionality of the control system of FIG. 1, in accordance with an exemplary embodiment.

FIG. 2 is a flow diagram depicting functionality of the control system 11 of FIG. 1, in accordance with exemplary embodiments. As depicted in FIG. 2, and similar to the discussion above, in various embodiments the control 11 system includes the processor 38, memory 40, internal cameras 73, external cameras 74, and display system 75 of FIG. 1.

As noted above, in various embodiments, the external cameras 74 capture changes in one or more fixed reference points of the vehicle 12 (e.g., with respect to a rear camera and/or other external camera 74 of the vehicle 12) and movement of a fixed scene feature outside the vehicle 12 (e.g., with respect to any number of external cameras 74 of the vehicle 12). Also as noted above, in various embodiments, the internal cameras 73 capture and detect movement of objects within the cabin 75 of the vehicle 12 when a vehicle event occurs.

As depicted in FIG. 2, the camera data from the internal cameras 73 and the external camera 74 is utilized in connection with one or more computer algorithms 202 for determining whether a vehicle event has occurred, including whether another vehicle has contacted the vehicle 12. In various embodiments, such a vehicle event is determined to have occurred based on one or more of the following has occurred in successive camera images over time: (i) whether fixed reference points of the vehicle 12 in a camera image have changed; (ii) whether a fixed scene feature outside the vehicle 12 has moved; and/or (iii) whether an object in the vehicle cabin has moved. In various embodiments, the algorithm(s) 202 are stored in the memory 40 and executed by the processor 38. Also in various embodiments, the algorithms 202 are implemented in connection with the process 300 described further below in connection with FIG. 3 and the implementations described further below in connection with FIGS. 4-9.

With continued reference to FIG. 2, in various embodiments, when a vehicle event has been detected and/or determined (including when another vehicle has contacted the vehicle 12), the processor provides instructions 204 to disengage the RESS 19 of FIG. 1 (e.g., by disengaging contactors of a high voltage battery comprising the RESS 19).

In addition, in various embodiments, when such a vehicle event is detected and/or determined, the processor 38 also provides notifications 206 regarding the vehicle event. In various embodiments, the notifications 206 include a first notice to one or more back offices and/or remote server, such as to remote server 18 of FIG. 1 via one or more wireless carrier systems and/or networks 14 of FIG. 1. Also in various embodiments, the notifications 206 further include a notification to user of the vehicle 12 via the electronic device 15 of the user (e.g., a smart phone and/or other electronic device), for example via the wireless carrier system 14 and the remote server 18 in various embodiments. In addition, in certain embodiments, the notifications 206 further include one or more messages via display system 67 of FIG. 1, for example on a visual display screen thereof.

Figure 3:
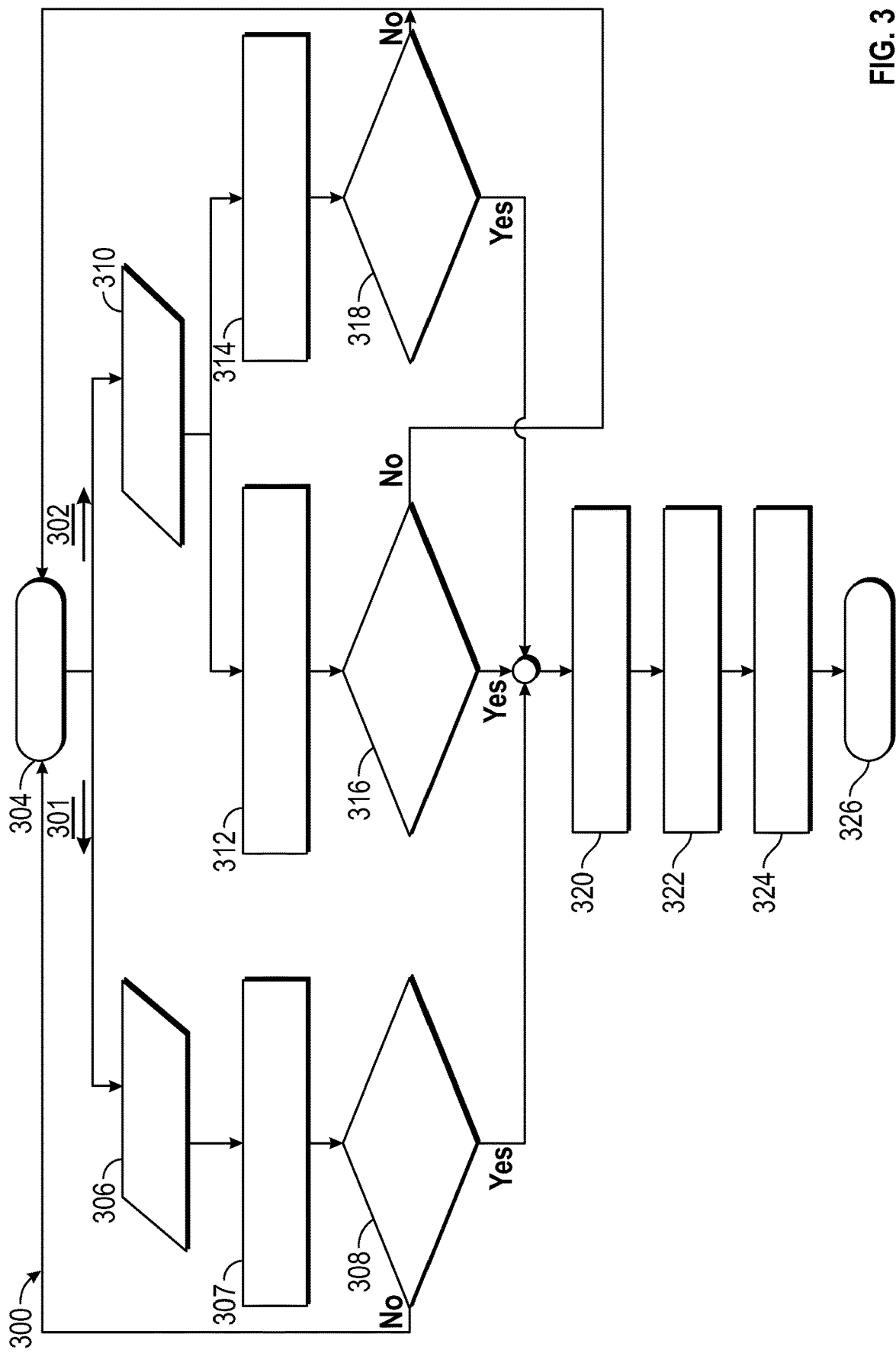
FIG. 3 is a flowchart of a process for detecting vehicle events using camera data, and that can be used in connection with the communications system of FIG. 1, including the vehicle thereof, the control system of FIGS. 1 and 2, and other components thereof, in accordance with exemplary embodiments.

FIG. 3 is a flowchart of a process 300 for detecting vehicle events using camera data, in accordance with an exemplary embodiment. In various embodiments, the process 300 can be used in connection with the communications system 10 of FIG. 1, including the vehicle 12 thereof, the control system 11 of FIGS. 1 and 2, and other components thereof.

As depicted in FIG. 3, in various embodiments the process 300 begins at step 304. In certain embodiments, the process 300 begins when the control system 11 of FIGS. 1 and 2 is activated. For example, in certain embodiments, the process 300 begins when one or more users of the vehicle 12 (e.g., a driver) approaches or enters the vehicle 12, or turns on the vehicle 12 and/or an ignition therefor (e.g. by turning a key, engaging a keyfob or start button, and so on), and/or when a vehicle drive begins or is initiated. In certain other embodiments, the process 300 begins when a user places the vehicle 12 in a "park" position and/or exits the vehicle 12. In certain embodiments, the steps of the process 300 are performed continuously while the control system 11 is activated.

In various embodiments, the process 300 proceeds with both a first path 301 and a second path 302. As depicted in FIG. 3, in various embodiments, the first path 301 begins with step 306 (described below), whereas the second path 302 begins with step 310 (described further below). In various embodiments, the first path 301 and the second path 302 are performed simultaneously.

In various embodiments, the first path 301 of the process 300 begins with obtaining camera footage from interior cameras (step 306). In various embodiments, camera images are obtained from the interior cameras 73 of FIGS. 1 and 2. In certain embodiments, video camera images are obtained from the interior cameras 73 with views inside the vehicle 12. In certain embodiments, still camera images are obtained from the interior cameras 73 with views inside the vehicle 12, and/or a sequence of still images comprising video images.

Also in various embodiments, objects are located from the interior camera footage (step 306). Specifically, in various embodiments, one or more objects inside the cabin 75 of the vehicle 12 of FIG. 1 are identified based on still and/or video images and/or segments of the interior camera data, and the locations of the objects inside the cabin 75 are calculated. In various embodiments, the identification of the objects and the calculation of their locations are performed by the processor 38 of FIGS. 1 and 2 using the interior camera data of step 306 at various points in time.

In various embodiments, a determination is made as to whether any of the identified objects inside the vehicle cabin have relocated (step 307). In various embodiments, this determination is made by the processor 38 of FIGS. 1 and 2 using the interior camera data of step 306. Specifically, in various embodiments, still and/or video camera images and/or segments from different points of time during different iterations of step 306 are analyzed to determine whether the location of any of the identified objects have changed.

Figure 4:
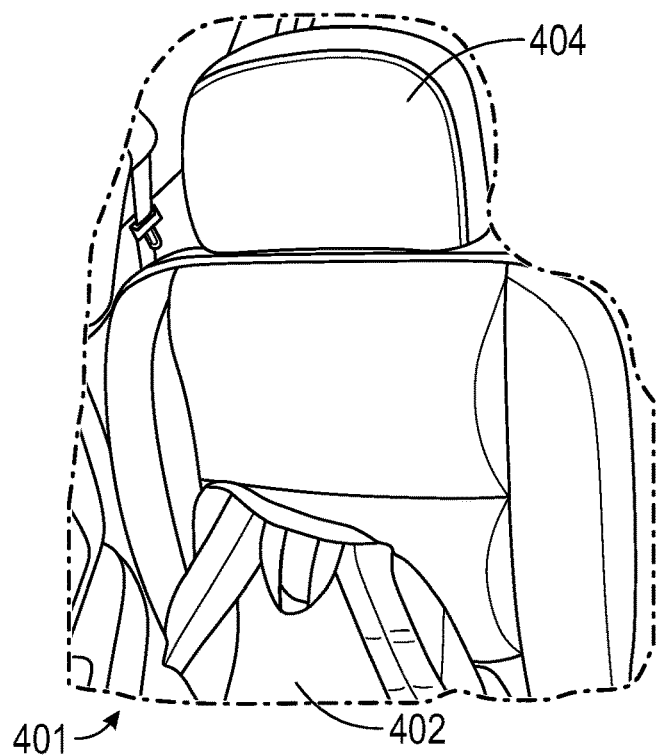
FIGS. 4 and 5 depict exemplary illustrations of an implementation of the process of FIG. 3, in which a vehicle event is detected based on camera data showing a relocation of an object inside the vehicle, in accordance with an exemplary embodiment.
Figure 5:
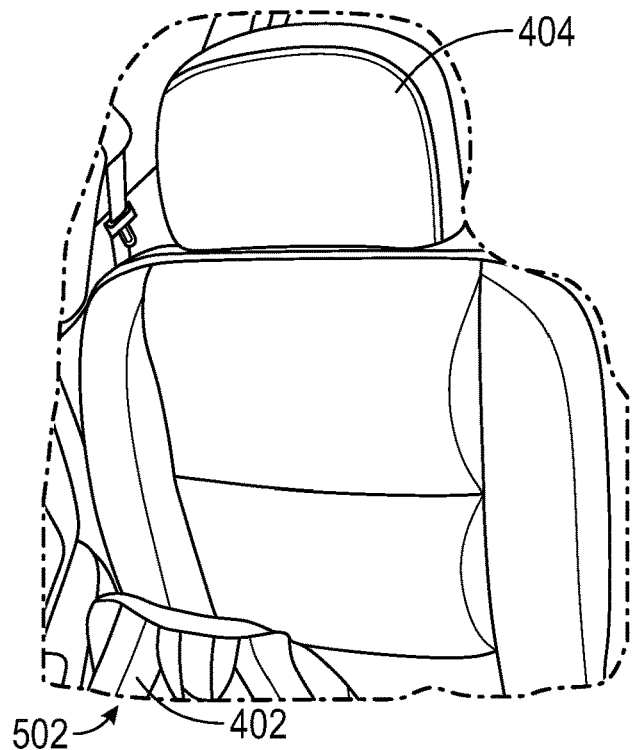

With reference to FIGS. 4 and 5, exemplary illustrations are provided with respect to step 306, in which a vehicle event is detected based on camera data showing a relocation of an object inside the vehicle, in accordance with an exemplary embodiment. Specifically, FIG. 4 depicts an object 402 (e.g., a backpack) at a first location 401 of a passenger seat 404 of the vehicle 12, as captured via internal camera images at a first point in time. In addition, FIG. 5 depicts the object 402 (e.g., the backpack) at a second location 502 of the passenger seat 404, as captured via internal camera images at a second point in time (that is subsequent to the first point in time depicted in FIG. 4). In the exemplary implementations of FIGS. 4 and 5, a vehicle event would be determined to have occurred, due to the relocation of the object 402 resulting from the vehicle event.

With reference back to FIG. 3, if it is determined at step 308 that an object in the cabin of the vehicle has relocated, then it is determined that a vehicle event has occurred. In various embodiments, the processor 38 determines, based on this evidence, that the vehicle event has occurred. In various embodiments, the processor 38 determines that another vehicle has contacted the vehicle 12.

In addition, due to this determination from step 308 that a vehicle event has occurred, the RESS 19 of FIG. 1 is disconnected and/or disengaged (step 320). Specifically, in various embodiments, the processor 38 provides instructions for battery contactors of the RESS 19 (e.g., of a high voltage battery of the vehicle 12) to be disengaged.

Also in various embodiments, when a determination is made from step 308 that a vehicle event has occurred, one or more notifications are provided (step 322). In various embodiments, the processor 38 provides a notification to remote server 18 of FIG. 1 via wireless carrier system 14 of FIG. 1 regarding the vehicle event (e.g., so that emergency responders may be notified, and so on). Also in various embodiments, the processor 38 also provides a notification to a user of the vehicle 12, for example to an electronic device 15 of FIG. 1 thereof. Such a notification may be helpful, for example when the user would not otherwise have received such information, for example when the vehicle 12 is parked and/or when a different user is currently operating and/or riding in the vehicle 12.

Also in various embodiments, when a determination is made from step 308 that a vehicle event has occurred, one or more messages are also displayed in the cabin of the vehicle (step 324). In various embodiments, the processor 38 provides instructions for a message to display on the vehicle display system 67 of FIG. 1. In various embodiments, the message may indicate both that the vehicle event has occurred and that the RESS has been deactivated. In certain embodiments, the message is displayed visually on a display screen of the vehicle display system 67. In certain embodiments, a notification is provided to remote server 18 of FIG. 1 via wireless carrier system 14 of FIG. 1 regarding the vehicle event (e.g., so that emergency responders may be notified, and so on). Also in various embodiments, the processor 38 also provides a notification to a user of the vehicle 12, for example to an electronic device 15 of FIG. 1 thereof. Such a notification may be particularly helpful, for example when the user would not otherwise have received such information, for example when the vehicle 12 is parked and/or when a different user is currently operating and/or riding in the vehicle 12.

In various embodiments, following steps 320, 322, and 324, the process 300 then terminates at step 326.

With reference back to step 304, in various embodiments the second path 302 of the process 300 begins with obtaining camera footage from external cameras (step 310). In various embodiments, camera images are obtained from the external cameras 74 of FIGS. 1 and 2. In certain embodiments, video and/or still camera images are obtained from the external cameras 74 with views outside the vehicle 12 (e.g., behind the vehicle 12, in front of the vehicle 12, to the sides of the vehicle 12, and/or around the vehicle 12).

Also in various embodiments, a determination is made as to a body occlusion of the vehicle in the external camera data (step 312). In various embodiments, during step 312, the processor 38 identifies, and determines a location of, one or more fixed body parts of the vehicle 12 as appears in one or more of the camera images of the external camera data of step 310. In various embodiments, the identification of the body occlusions and the calculation of the locations thereof are performed by the processor 38 of FIGS. 1 and 2 using the external camera data of step 310 at various points in time.

In various embodiments, a determination is made as to whether any of the body occlusions of the vehicle body in the external images have moved in the external camera images (step 316). In various embodiments, this determination is made by the processor 38 of FIGS. 1 and 2 using the external camera data of step 310. Specifically, in various embodiments, still and/or video camera images and/or segments from different points of time during different iterations of step 310 are analyzed to determine whether the location of any of the identified objects have changed.

Figure 6:
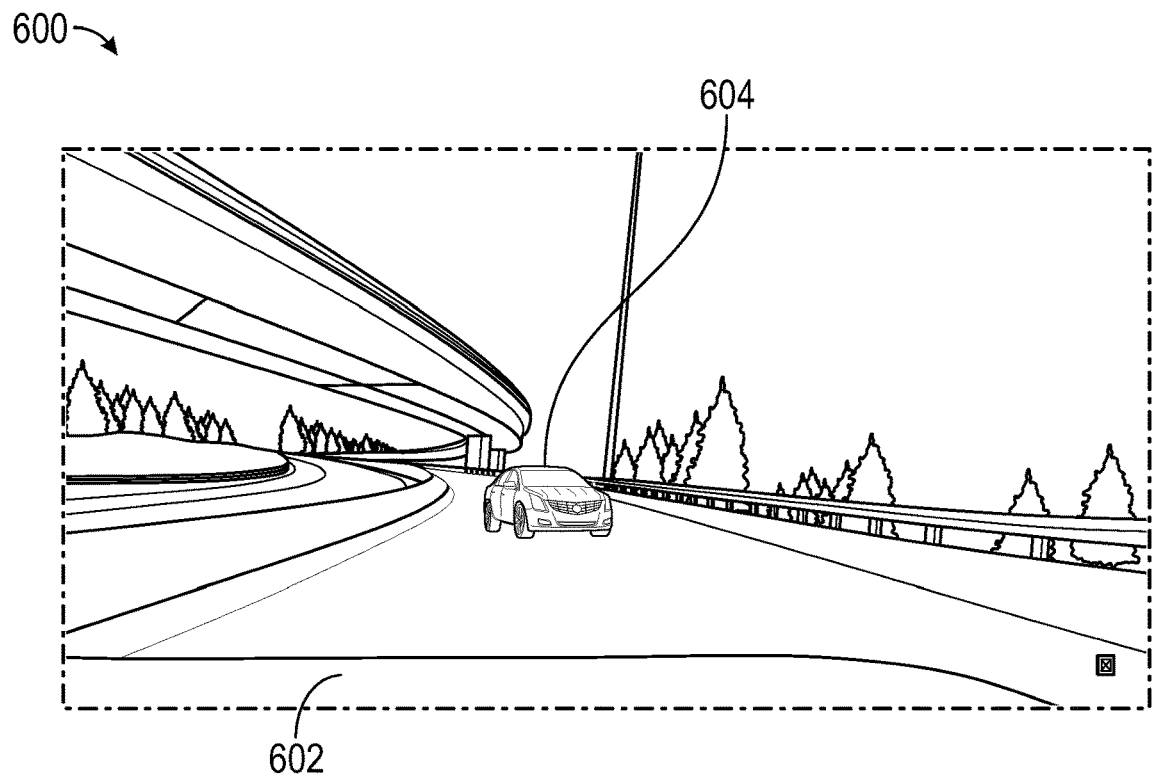
FIGS. 6 and 7 depict exemplary illustrations of an implementation of the process of FIG. 3, in which a vehicle event is detected based on camera data showing a change in a body reference of the vehicle, in accordance with an exemplary embodiment.
Figure 7:
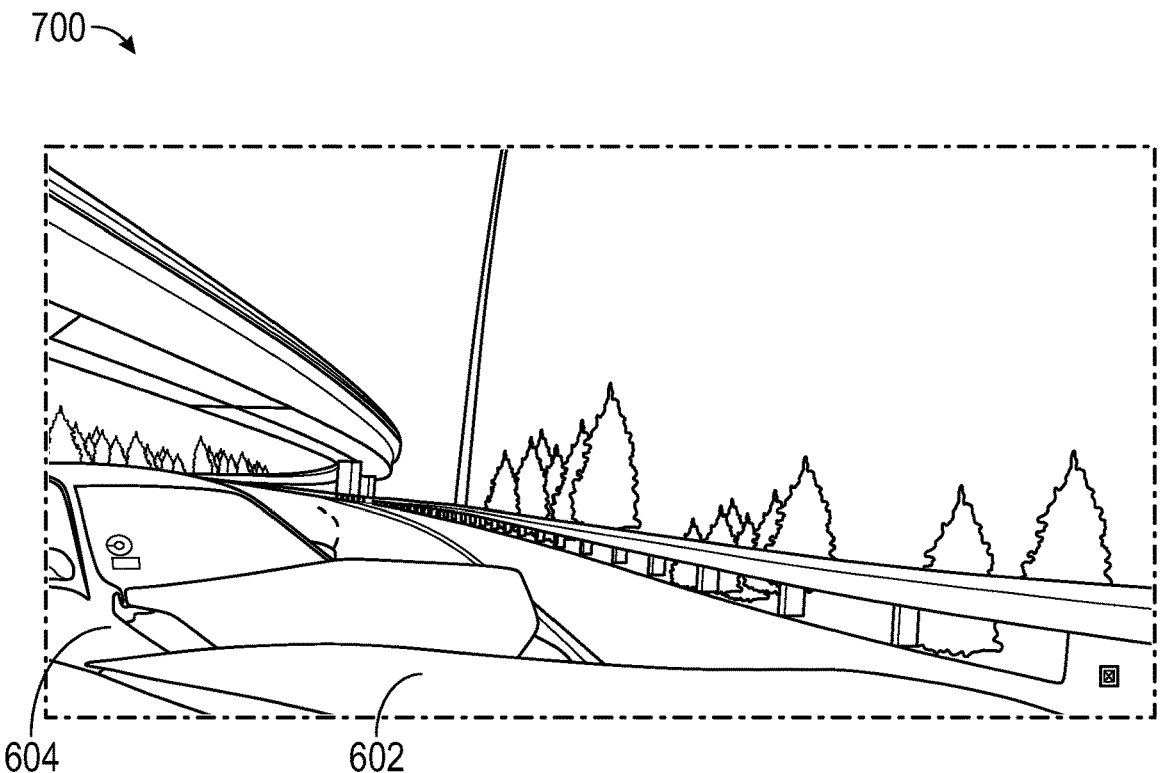

With reference to FIGS. 6 and 7, exemplary illustrations are provided with respect to step 316, in which a vehicle event is detected based on camera data showing a movement of a body occlusion in one of the external camera data images, in accordance with an exemplary embodiment. Specifically, FIG. 6 depicts a first external image 600 (e.g., at a first point in time) showing a body occlusion 602 (e.g., part of a fender of the vehicle 12) in a first position. Also shown in FIG. 6 is another vehicle 604 that is in proximity to the host vehicle 12. In addition, FIG. 7 depicts a second external image 700 (e.g., at a second point in time that is subsequent to the first point of time of FIG. 6) showing the body occlusion 602 (e.g., part of a fender of the vehicle 12) in a second position. As shown in FIG. 7, the position of the fender has been changed, due to the vehicle event caused by the contact of the other vehicle 604 with the host vehicle 12. This can be due, for example, based on a bending of the fender and/or a change in the orientation of the external cameras 74 due to the vehicle event. In the exemplary implementations of FIGS. 6 and 7, a vehicle event would be determined to have occurred, due to the change in the position of the body occlusion and/or the change in the orientation of the external cameras 74. While FIGS. 6 and 7 show one exemplary implementation in which the body occlusion 602 comprises a rear facing camera (e.g., a back-up camera), it will be appreciated that in various embodiments different types of external cameras 74 may be utilized (e.g., front cameras, side cameras, and so on), with different corresponding body occlusions (e.g., a front fender, a side body component, and so on) in various different embodiments.

With reference back to FIG. 3, if it is determined at step 316 that body occlusion in the external camera image has moved, then it is determined that a vehicle event has occurred. In various embodiments, the processor 38 determines, based on this evidence, that the vehicle event has occurred. In various embodiments, the processor 38 determines that another vehicle has contacted the vehicle 12.

In addition, due to this determination from step 316 that a vehicle event has occurred, the process proceeds to steps 320-324 descried above, in which: (i) the RESS 19 of FIG. 1 is disconnected and/or disengaged (step 320); (ii) one or more notifications are provided to the remote server and/or the user (step 322); and (iii) one or more messages are displayed in the cabin of the vehicle (step 324). In various embodiments, the process then terminates at step 326.

With reference back to step 310, in various embodiments the external camera data of step 310 is also utilized to make determinations regarding fixed features outside the vehicle from the external camera images (step 314). In various embodiments, during step 314, the processor 38 identifies, and determines a location of, one or more fixed features outside the vehicle that appear in a scene represented in the external camera images, as they appear in one or more of the camera images of the external camera data of step 310. In exemplary embodiments, the fixed features may include parking lanes markers, traffic lane markers, stop signs, traffic lights, buildings, trees, rocks, and/or any number of other stationary objects that are outside the vehicle 12 and captured in the external camera images. In various embodiments, the identification of the fixed features outside the vehicle, and the calculation of the locations thereof are performed by the processor 38 of FIGS. 1 and 2 using the external camera data of step 310 at various points in time.

In various embodiments, a determination is made as to whether any of the identified fixed features outside the vehicle have moved in the external camera images (step 318). In various embodiments, this determination is made by the processor 38 of FIGS. 1 and 2 using the external camera data of step 310. Specifically, in various embodiments, still and/or video camera images and/or segments from different points of time during different iterations of step 310 are analyzed to determine whether the location of any of the fixed features have changed.

Figure 8:
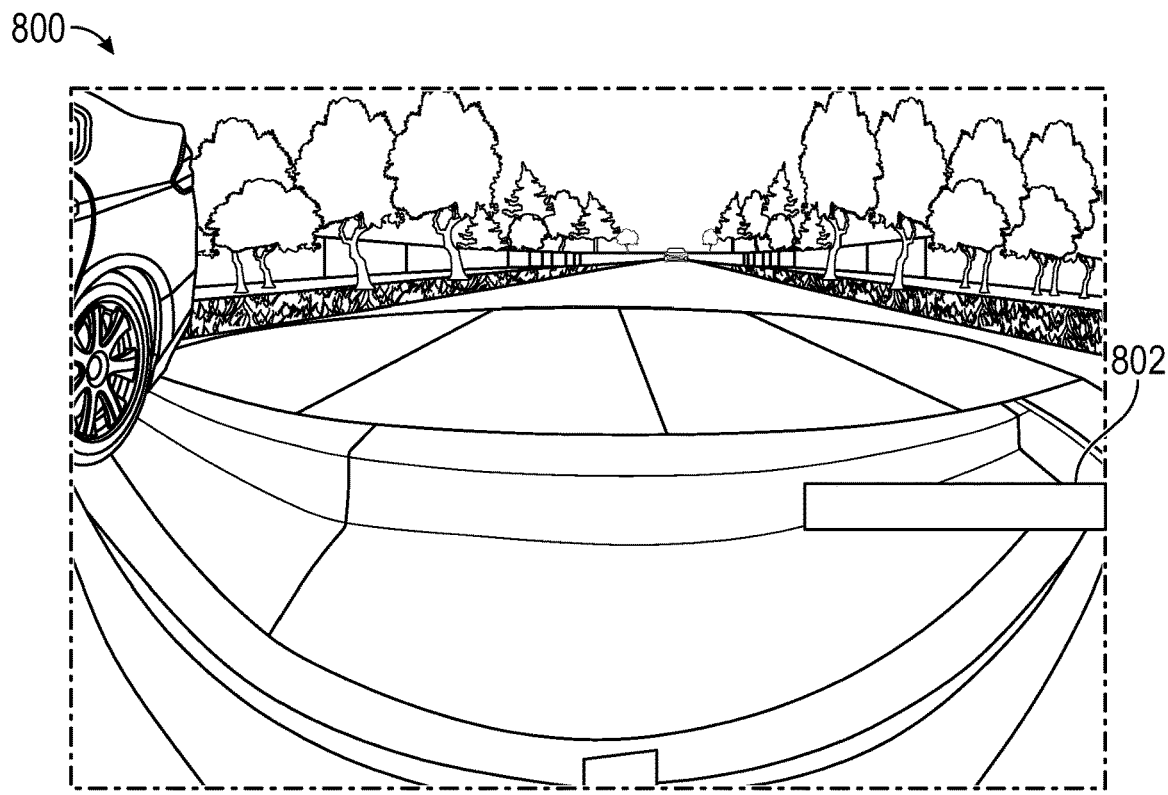
FIGS. 8 and 9 depict exemplary illustrations of an implementation of the process of FIG. 3, in which a vehicle event is detected based on camera data showing a change in a fixed scene feature outside the vehicle, in accordance with an exemplary embodiment.
Figure 9:
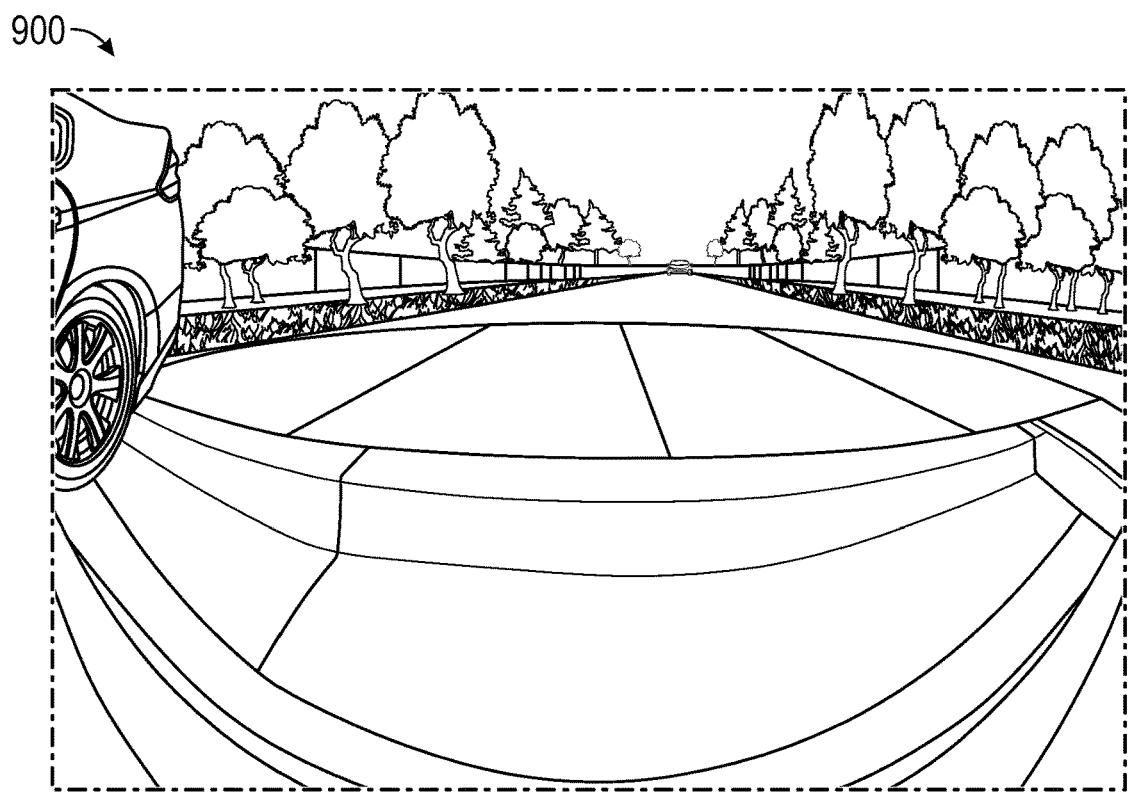

With reference to FIGS. 8 and 9, exemplary illustrations are provided with respect to step 318, in which a vehicle event is detected based on camera data showing a movement of a fixed feature in one of the external camera data images, in accordance with an exemplary embodiment. Specifically, FIG. 8 depicts a first external image 800 (e.g., at a first point in time) showing a fixed feature 802 (e.g., a parking lane marker) in a first position. In addition, FIG. 9 depicts a second external image 900 (e.g., at a second point in time that is subsequent to the first point of time of FIG. 8) in which the fixed feature 802 (i.e., the parking lane marker) no longer appears in the camera image. In the exemplary implementations of FIGS. 8 and 9, a vehicle event would be determined to have occurred, due to the change in the position of the fixed feature. While FIGS. 8 and 9 show one exemplary implementation in which the fixed feature 802 comprises a rear facing camera (e.g., a back-up camera), it will be appreciated that in various embodiments different types of external cameras 74 may be utilized (e.g., front cameras, side cameras, and so on), with different corresponding fixed features in various different embodiments.

With reference back to FIG. 3, if it is determined at step 318 that the fixed feature in the external camera image has moved, then it is determined that a vehicle event has occurred. In various embodiments, the processor 38 determines, based on this evidence, that the vehicle event has occurred. In various embodiments, the processor 38 determines that another vehicle has contacted the vehicle 12.

In addition, due to this determination from step 318 that a vehicle event has occurred, the process proceeds to steps 320-324 descried above, in which: (i) the RESS 19 of FIG. 1 is disconnected and/or disengaged (step 320); (ii) one or more notifications are provided to the remote server and/or the user (step 322); and (iii) one or more messages are displayed in the cabin of the vehicle (step 324). In various embodiments, the process then terminates at step 326.

In certain embodiments, the process 300 of FIG. 3 and the implementations of FIGS. 4-9 are utilized when the vehicle 12 is parked. For example, when the vehicle 12 is parked, movements of the various objects, body references, and fixed features may be more easily identified and/or associated with a vehicle event. By way of further example, when the vehicle 12 is parked, a user and/or remote server (and/or the processor 38 of the vehicle 12) may otherwise be unaware of the vehicle event, for example due to other event detection sensors being inactive, the user being away from the vehicle, and/or other communications with the remote server being inactive, and so on. However, in certain embodiments, the process 300 of FIG. 3 and/or the implementations of FIGS. 4-9 may also be utilized when the vehicle 12 is moving.

Accordingly, in various embodiments, methods and systems are provided for determining a vehicle event based on vehicle camera data. In various embodiments, data from external and/or internal vehicle cameras are utilized to determine whether a vehicle event has occurred, such as when another vehicle contacts the host vehicle.

It will be appreciated that the systems and methods may vary from those depicted in the Figures and described herein. For example, the communications system of FIG. 1, including the vehicle thereof and components thereof, may vary from that depicted in FIG. 1 and/or described herein, in various embodiments. It will similarly be appreciated that the control system of FIGS. 1 and 2, and/or various components thereof and/or functionality thereof, may vary from the depictions in FIGS. 1 and 2 and the accompanying descriptions. It will also be appreciated that the process (and/or subprocesses) disclosed herein may differ from those described herein and/or depicted in FIG. 3, and/or that steps thereof may be performed simultaneously and/or in a different order as described herein and/or depicted in FIG. 3, among other possible variations. It will similarly be appreciated that the implementations of FIGS. 4-9 may also vary in different embodiments.

While at least one example has been presented in the foregoing detailed description, it should be appreciated that a vast number of variations exist. It should also be appreciated that the example or examples are only examples, and are not intended to limit the scope, applicability, or configuration of the disclosure in any way. Rather, the foregoing detailed description will provide those skilled in the art with a convenient road map for implementing the example or examples. It should be understood that various changes can be made in the function and arrangement of elements without departing from the scope of the appended claims and the legal equivalents thereof

What is claimed is:

1. A method comprising:
obtaining camera data from one or more cameras onboard a vehicle while the vehicle is parked;
identifying, via a processor, a change in position of one or more objects of the camera data using the camera data while the vehicle is parked; and
determining, via the processor, that a vehicle event has occurred while the vehicle is parked, the vehicle event comprising another vehicle contacting the vehicle while the vehicle is parked, based on the change in position of the one or more objects of the camera data while the vehicle is parked.

2. The method of claim 1, wherein:
the step of obtaining the camera data comprises obtaining the camera data from one or more cameras facing inside a cabin of the vehicle while the vehicle is parked;
the step of identifying the change in position comprises identifying, via the processor, the change in position of one or more objects inside the cabin of the vehicle using the camera data while the vehicle is parked; and
the step of determining that the vehicle event has occurred comprises determining, via the processor, that the vehicle event has occurred based on the change in position of the one or more objects inside the cabin of the vehicle while the vehicle is parked.

3. The method of claim 2, wherein:
the step of identifying the change in position comprises identifying, via the processor, the change in position of the one or more objects disposed on a seat of the vehicle using the camera data while the vehicle is parked; and
the step of determining that the vehicle event has occurred comprised determining, via the processor, that the vehicle event has occurred based on the change in position of the one or more objects on the seat of the vehicle while the vehicle is parked.

4. The method of claim 1, wherein the step of obtaining the camera data comprises obtaining the camera data from one or more cameras facing outside the vehicle while the vehicle is parked.

5. The method of claim 4, wherein:
the step of identifying the change in position comprises identifying, via the processor, the change in position of a body reference of the vehicle using the camera data while the vehicle is parked; and
the step of determining that the vehicle event has occurred comprises determining, via the processor, that the vehicle event has occurred based on the change in position of the body reference of the vehicle while the vehicle is parked.

6. The method of claim 4, wherein:
the step of identifying the change in position comprises identifying, via the processor, the change in position of a fixed feature outside the vehicle using the camera data while the vehicle is parked; and
the step of determining that the vehicle event has occurred comprises determining, via the processor, that the vehicle event has occurred based on the change in position of the fixed feature outside the vehicle while the vehicle is parked.

7. The method of claim 1, further comprising:
providing a notification, via instructions provided by the processor, when the vehicle event is determined to have occurred based on the change in position of the one or more objects of the camera data while the vehicle is parked.

8. The method of claim 1, wherein the vehicle includes a rechargeable energy storage system (RESS), and the method further comprises:
disengaging the RESS, via the instructions provided by the processor, when the vehicle event is determined to have occurred based on the change in position of the one or more objects of the camera data while the vehicle is parked.

9. A system comprising:
one or more cameras onboard a vehicle that are configured to generate camera data while the vehicle is parked; and
a processor that is coupled to the one or more cameras and configured to at least facilitate:
identifying a change in position of one or more objects of the camera data using the camera data while the vehicle is parked; and
determining that a vehicle event has occurred while the vehicle is parked, the vehicle event comprising another vehicle contacting the vehicle while the vehicle is parked, based on the change in position of the one or more objects of the camera data while the vehicle is parked.

10. The system of claim 9, wherein:
the one or more cameras face inside a cabin of the vehicle; and
the processor is configured to at least facilitate:
identifying the change in position of one or more objects inside the cabin of the vehicle using the camera data while the vehicle is parked; and
determining that the vehicle event has occurred based on the change in position of the one or more objects inside the cabin of the vehicle while the vehicle is parked.

11. The system of claim 10, wherein the processor is configured to at least facilitate:
identifying the change in position of the one or more objects disposed on a seat of the vehicle using the camera data while the vehicle is parked; and
determining that the vehicle event has occurred based on the change in position of the one or more objects on the seat of the vehicle while the vehicle is parked.

12. The system of claim 9, wherein the processor is configured to at least facilitate:
obtaining the camera data from one or more cameras facing outside the vehicle while the vehicle is parked.

13. The system of claim 12, wherein the processor is configured to at least facilitate:
identifying the change in position of a body reference of the vehicle using the camera data while the vehicle is parked; and
determining that the vehicle event has occurred based on the change in position of the body reference of the vehicle while the vehicle is parked.

14. The system of claim 12, wherein the processor is configured to at least facilitate:
identifying the change in position of a fixed feature outside the vehicle using the camera data while the vehicle is parked; and
determining that the vehicle event has occurred based on the change in position of the fixed feature outside the vehicle while the vehicle is parked.

15. A vehicle comprising:
a body;
a drive system configured to propel the body;
one or more cameras onboard the body and configured to generate camera data while the vehicle is parked; and
a processor that is coupled to the one or more cameras and configured to at least facilitate:
identifying a change in position of one or more objects of the camera data using the camera data while the vehicle is parked; and
determining that a vehicle event has occurred while the vehicle is parked, the vehicle event comprising another vehicle contacting the vehicle while the vehicle is parked, based on the change in position of the one or more objects of the camera data while the vehicle is parked.

16. The vehicle of claim 15, wherein:
the body forms a cabin for the vehicle;
the one or more cameras face inside the cabin; and
the processor is configured to at least facilitate:
identifying the change in position of one or more objects inside the cabin using the camera data while the vehicle is parked; and
determining that the vehicle event has occurred based on the change in position of the one or more objects inside the cabin.

17. The vehicle of claim 15, wherein:
the one or more cameras face outward of the cabin of the vehicle; and
the processor is configured to at least facilitate:
identifying the change in position of a body reference of the vehicle using the camera data; and
determining that the vehicle event has occurred based on the change in position of the body reference of the vehicle.

18. The vehicle of claim 15, wherein:
the one or more cabins face outward of the cabin of the vehicle; and
the processor is configured to at least facilitate:
identifying the change in position of a fixed feature outside the vehicle using the camera data; and
determining that the vehicle event has occurred based on the change in position of the fixed feature outside the vehicle.

19. The method of claim 2, wherein:
the one or more objects comprise one or more non-human objects disposed on a passenger seat of the vehicle;
the step of identifying the change in position comprises identifying, via the processor, the change in position of the one or more non-human objects disposed on the passenger seat of the vehicle using the camera data while the vehicle is parked; and
the step of determining that the vehicle event has occurred comprised determining, via the processor, that the vehicle event has occurred based on the change in position of the one or more non-human objects on the passenger seat of the vehicle while the vehicle is parked.

20. The method of claim 19, wherein:
the one or more objects comprise a backpack disposed on the passenger seat of the vehicle;
the step of identifying the change in position comprises identifying, via the processor, the change in position of the backpack disposed on the passenger seat of the vehicle using the camera data while the vehicle is parked; and
the step of determining that the vehicle event has occurred comprised determining, via the processor, that the vehicle event has occurred based on the change in position of the backpack on the passenger seat of the vehicle while the vehicle is parked.

* * * * *